(12) United States Patent
Albrecht

(10) Patent No.: US 10,695,868 B2
(45) Date of Patent: *Jun. 30, 2020

(54) LASER HYBRID WELDING CONTROL SYSTEMS AND METHODS

(71) Applicant: Illinois Tool Works Inc., Glenview, IL (US)

(72) Inventor: Bruce Patrick Albrecht, Neenah, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/365,153

(22) Filed: Mar. 26, 2019

(65) Prior Publication Data

US 2019/0217418 A1 Jul. 18, 2019

Related U.S. Application Data

(63) Continuation of application No. 15/351,006, filed on Nov. 14, 2016, now Pat. No. 10,239,158, which is a (Continued)

(51) Int. Cl.
*B23K 26/03* (2006.01)
*B23K 26/348* (2014.01)
(Continued)

(52) U.S. Cl.
CPC .......... *B23K 26/348* (2015.10); *B23K 9/0953* (2013.01); *B23K 9/0956* (2013.01);
(Continued)

(58) Field of Classification Search
None
See application file for complete search history.

(56) References Cited

U.S. PATENT DOCUMENTS 4,446,354 A 5/1984 Kearney
5,121,339 A 6/1992 Jenuwine
(Continued)

FOREIGN PATENT DOCUMENTS

FR 2867996 9/2005
WO 2005056230 6/2005

OTHER PUBLICATIONS

International Search Report for application No. PCT/EP2010/037997 dated Sep. 22, 2010.

*Primary Examiner* — Benjamin P Sandvik
(74) *Attorney, Agent, or Firm* — McAndrews, Held & Malloy, Ltd.

(57) ABSTRACT

Laser hybrid welding systems adapted to identify and/or fix a weld defect occurring during a laser hybrid welding process are provided. Embodiments of the laser hybrid welding system may include one or more devices that provide feedback to a controller regarding one or more weld parameters. One embodiment of the laser hybrid welding system includes sensors that are adapted to measure the weld voltage and/or amperage during the welding process and transmit the acquired data to the controller for processing. Another embodiment of the laser hybrid welding system includes a lead camera and a lag camera that film an area directly in front of the weld location and directly behind the weld location.

11 Claims, 4 Drawing Sheets

Related U.S. Application Data continuation of application No. 14/807,235, filed on Jul. 23, 2015, now Pat. No. 9,498,852, which is a continuation of application No. 14/012,407, filed on Aug. 28, 2013, now Pat. No. 9,095,930, which is a continuation of application No. 12/776,274, filed on May 7, 2010, now Pat. No. 8,552,337.

(60) Provisional application No. 61/186,116, filed on Jun. 11, 2009.

(51) Int. Cl.
　　*B23K 37/00*　　(2006.01)
　　*B23K 28/02*　　(2014.01)
　　*B23K 31/12*　　(2006.01)
　　*B23K 9/095*　　(2006.01)
　　*B23K 26/20*　　(2014.01)

(52) U.S. Cl.
　　CPC ............ *B23K 26/032* (2013.01); *B23K 26/20* (2013.01); *B23K 28/02* (2013.01); *B23K 31/12* (2013.01); *B23K 31/125* (2013.01); *B23K 37/00* (2013.01)

(56) References Cited

U.S. PATENT DOCUMENTS

| | | |
|---|---|---|
| 5,651,903 A | 7/1997 | Shirk |
| 6,155,475 A | 12/2000 | Ekelof |
| 6,583,386 B1 | 6/2003 | Ivkovich |
| 6,844,521 B2 | 1/2005 | Staufer |
| 6,854,632 B1 | 2/2005 | Larsson |
| 7,015,419 B2 | 3/2006 | Hackl |
| 7,043,330 B2 | 5/2006 | Toyserkani |
| 7,107,118 B2 | 9/2006 | Orozco |
| 7,759,603 B2 | 7/2010 | Aigner |
| 8,046,178 B2 | 10/2011 | Dai |
| 8,552,337 B2 | 10/2013 | Albrecht |
| 9,095,930 B2 | 8/2015 | Albrecht |
| 10,239,158 B2 * | 3/2019 | Albrecht .............. B23K 9/0953 |
| 2008/0072674 A1 | 3/2008 | Ume |
| 2009/0095720 A1 | 4/2009 | Kamei |
| 2009/0312958 A1 | 12/2009 | Dai |
| 2010/0107725 A1 | 5/2010 | Iizuka |
| 2011/0198317 A1 | 8/2011 | Lin |
| 2012/0325786 A1 | 12/2012 | Tolling |

* cited by examiner

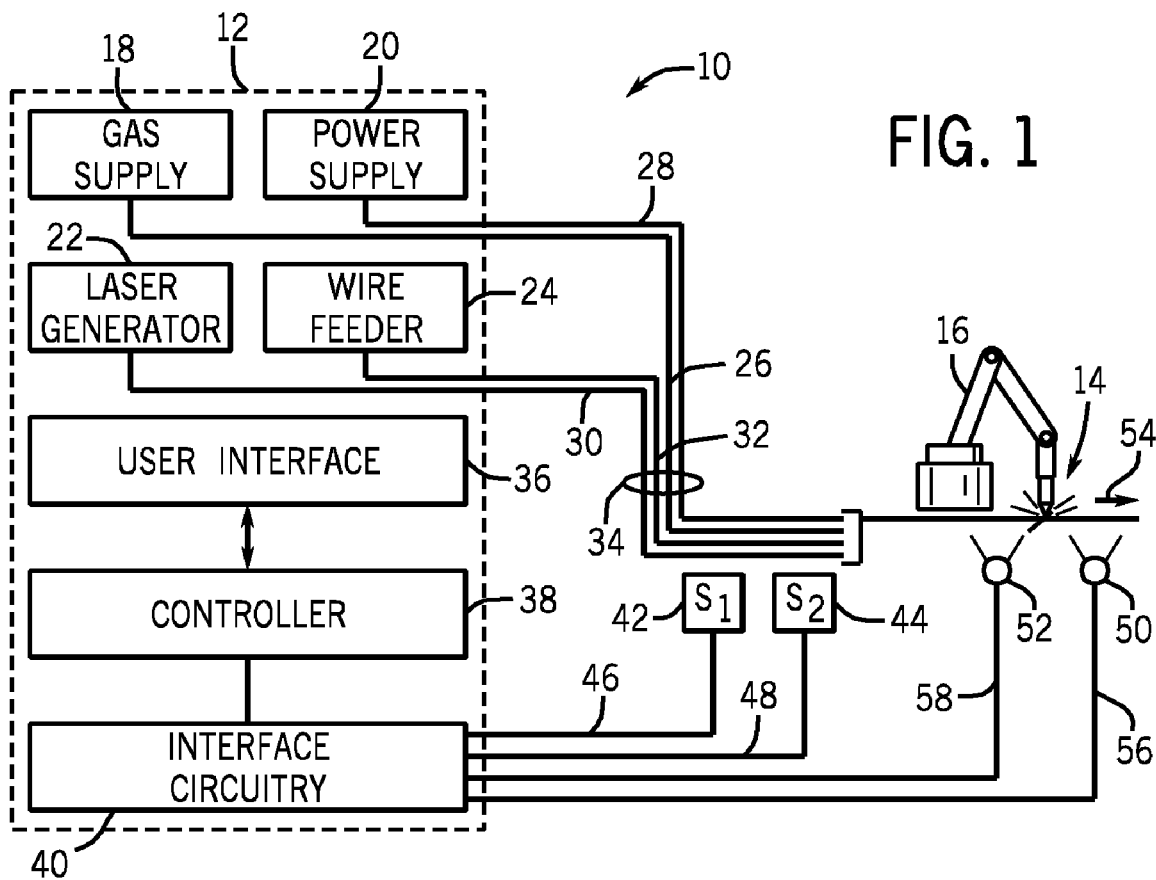
FIG. 1
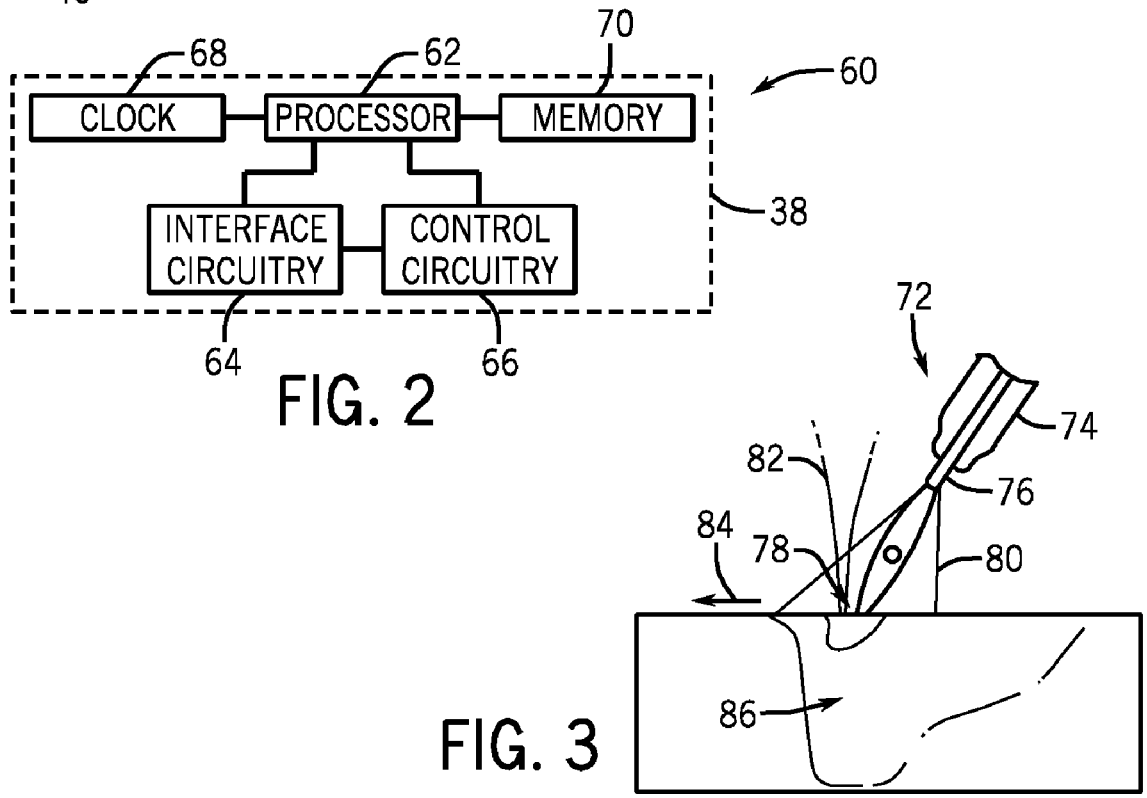
FIG. 2
FIG. 3

LASER HYBRID WELDING CONTROL SYSTEMS AND METHODS

CROSS REFERENCE TO RELATED APPLICATIONS

This application is a Continuation Application of U.S. patent application Ser. No. 15/351,006, entitled "Laser Hybrid Welding Control Systems and Methods", filed Nov. 14, 2016, which is a Continuation Application of U.S. patent application Ser. No. 14/807,235, entitled "Weld Defect Detection Systems and Methods for Laser Hybrid Welding", filed Jul. 23, 2015, which is a Continuation Application of U.S. patent application Ser. No. 14/012,407, entitled "Weld Defect Detection Systems and Methods for Laser Hybrid Welding", filed Aug. 28, 2013, which issued as U.S. Pat. No. 9,095,930 on Aug. 4, 2015, and which is a Continuation Application of U.S. patent application Ser. No. 12/776,274, entitled "Weld Defect Detection Systems and Methods for Laser Hybrid Welding", filed May 7, 2010, which issued as U.S. Pat. No. 8,552,337 on Oct. 8, 2013, and which is a Non-Provisional Patent Application of U.S. Provisional Patent Application No. 61/186,116, entitled "Gap Filling with Laser Hybrid Welding", filed Jun. 11, 2009, all of which are herein incorporated by reference.

BACKGROUND

The invention relates generally to laser hybrid welding systems, and, more particularly, to controllers for laser hybrid welding systems.

Welding is a process that has become increasingly ubiquitous in various industries and applications. A variety of welding techniques have been developed that seek to provide fast welding capabilities with adequate penetration and gap bridegability. While laser beam welding provides speed and deep penetration benefits, such a welding process typically requires tight joint fitup for the laser beam to adequately bridge the gap between the workpieces. Arc welding processes, on the other hand, typically provide for welding more slowly than laser-beam processes, but are capable of bridging much larger gaps than laser-beams. As such, a variety of hybrid welding techniques have been developed that combine laser-beam welding with arc welding processes, such as gas metal arc welding (GMAW). This type of welding process typically aims a laser beam at a location where a weld joint is to be formed, and follows it closely, typically via the same, hybrid welding torch, with a more conventional shielded arc for additional fusion and filler metal deposition.

While hybrid welding processes provide good bridgeability at high speeds, such processes are often associated with drawbacks, such as intolerability of gaps in the joint. These drawbacks often reduce or eliminate the applicability of laser hybrid welding to a variety of applications, such as pipelines, ship building, and automotive manufacturing. Some advances, such as beam width increasing systems, have been made to improve the gap filling associated with laser hybrid welding. However, laser hybrid welding still poses challenges surrounding gap filling since penetration cannot be adequately controlled when gaps occur in the weld. Accordingly, there exists a need for systems that address these limitations of laser hybrid welding.

BRIEF DESCRIPTION

In an exemplary embodiment, a laser hybrid welding system includes a sensor adapted to acquire data regarding a parameter of a laser hybrid welding operation. The laser hybrid welding system also includes a controller communicatively coupled to the sensor and adapted to receive the acquired data from the sensor and to determine whether the acquired data is indicative of a welding defect. If the acquired data is indicative of a welding defect, the controller is adapted to output a control signal that directs the laser hybrid welding system to attempt to fix the welding defect.

In another embodiment, a controller for a laser hybrid welding system includes interface circuitry adapted to receive data regarding a parameter of a laser hybrid welding operation and to output one or more control signals. The controller also includes a processor communicatively coupled to the interface circuitry and adapted to receive the data from the interface circuitry and to process the received data to determine whether a weld defect has occurred. The controller also includes memory coupled to the processor and adapted to receive and store the processed data from the processor for later retrieval.

In another embodiment, a laser hybrid welding system includes a sensor adapted to acquire data regarding a parameter of a laser hybrid welding operation. The laser hybrid welding system also includes a controller communicatively coupled to the sensor and adapted to receive the acquired data from the sensor and to determine whether the acquired data is indicative of a welding defect. If the acquired data is indicative of a welding defect, the controller is further configured to alert an operator of the welding defect and to log the welding defect as an error in an associated memory.

DRAWINGS

These and other features, aspects, and advantages of the present invention will become better understood when the following detailed description is read with reference to the accompanying drawings in which like characters represent like parts throughout the drawings, wherein:

FIG. 1 illustrates an exemplary welding system including a controller for use in a laser hybrid welding operation in accordance with aspects of the present invention;

FIG. 2 is a block diagram illustrating exemplary components of the controller of FIG. 1 in accordance with aspects of the present invention;

FIG. 3 illustrates an exemplary laser hybrid welding operation including a laser beam and a welding arc in accordance with aspects of the present invention;

DETAILED DESCRIPTION

Figure 4:
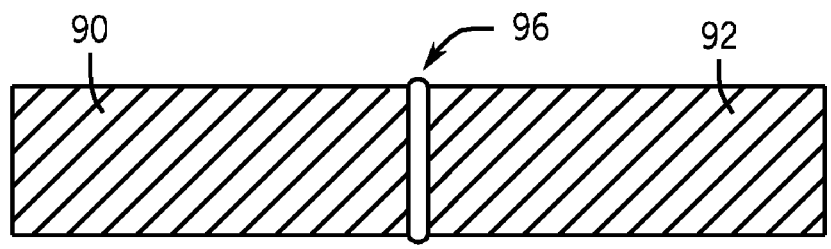
FIG. 4 is an exemplary weld bead that illustrates a weld without a defect in accordance with aspects of the present invention.

As described in detail below, embodiments are provided of a laser hybrid welding system adapted to identify and/or to fix a weld defect occurring during a laser hybrid welding process. The disclosed laser hybrid systems may be configured to detect and/or repair weld defects such as those sometimes referred to as "burn-through", a "suck-back", inadequate weld reinforcement, improper alignment, cracks, incomplete penetration, and incomplete fusion. To that end, the laser hybrid welding system may include one or more devices that provide feedback to a controller regarding one or more weld parameters. For instance, in one embodiment, the laser hybrid welding system may include sensors, such as a voltage sensor and/or a current sensor that measure the weld voltage and/or amperage during the welding process and transmit the acquired data to the controller for processing. Such parameters may provide an indication of a weld defect that has occurred. For further example, a leading camera and a following camera that image an area directly in front of the weld location and directly behind the weld location may be provided. The controller may compare the pre-weld and post-weld images to determine whether a weld defect has occurred. Still further, the controller may time stamp the acquired data and utilize such time stamps (e.g., in conjunction with a known or estimated rate of advance) to compute the location of the detected weld defect with respect to a reference (e.g., present) location. Additionally, one or more audio sensors may be employed to determine the presence and location of the weld defect. As such, embodiments of the presently disclosed laser hybrid welding systems may be capable of detecting and repairing weld defects during the welding process.

Turning now to the drawings, FIG. 1 illustrates a welding system 10 for use in a laser hybrid welding operation. The laser hybrid welding operation may be any welding operation that combines features of laser beam welding with features of arc beam welding. For example, the laser hybrid welding operation may combine laser welding with gas metal arc welding (GMAW) processes, such as a metal inert gas (MIG) welding process. Indeed, the welding system 10 of FIG. 1 may be utilized in any laser hybrid welding operation and with any suitable joint geometry.

The welding system 10 includes a welder 12 that provides supplies, such as welding wire, power, and so forth, to a welding operation 14 being performed by a robot 16. In the illustrated embodiment, the welder 12 includes a gas supply 18, a power supply 20, a laser generator 22, and a wire feeder 24 that supply gas through cable 26, power through cable 28, laser power through cable 30, and wire through cable 32, respectively, to a welding torch for use in the welding operation 14. It should be noted that the cables 26, 28, 30, and 32 may be combined into a single cable 34 that couples the welder 12 to the welding torch in some embodiments.

The welder 12 also includes a user interface 34 coupled to a controller 36 and interface circuitry 30. During use, an operator may input desired weld operating parameters to the welder 12 via the user interface 26. Additionally, the user interface 26 may be utilized by the welding system 10 to communicate detection of one or more weld defects to the user as the weld progresses. For example, the user interface 26 may be configured to notify the operator when a burn-through, an excess weld reinforcement or a suck-back defect has occurred. In some embodiments, such defects may be determined by the presence of a first sensor 32 and a second sensor 34 that are configured to sense one or more parameters of the weld. For example, the first sensor 32 may be adapted to measure the actual weld voltage level and the second sensor 34 may be adapted to measure the actual weld current level. The acquired measurements may then be communicated back to the interface circuitry 40 in the welder 12 via cables 46 and 48. The interface circuitry 40 then routes the acquired measurements to the controller 38 in the desired way. For example, the interface circuitry 40 may be configured to obtain measurement data from the sensors as the data is acquired, for rapid detection and repair of defects. Alternatively, they may transmit such data to the controller 38 at predetermined periods of time (e.g., once every five minutes, once every ten minutes, etc.). After receiving the measurement data, the controller 38 processes the data to determine whether a defect has occurred and, if so, where in the weld material the defect exists. For example, a processor located in the controller may convert the voltage-time data and the amperage-time data to the frequency domain via a fast Fourier transform (FFT) and analyze the converted data to determine the presence of a weld defect based upon known frequencies that should occur in normal welding, and those that can occur that are characteristics of such defects. The controller 38 may then notify the operator of the defect via the user interface 36 and/or may direct the repair of such a defect.

Furthermore, the presence of one or more weld defects may be detected via the use of a leading camera 50 positioned in front of the weld and a following camera 52 positioned behind a weld as the welding operation 14 proceeds in the direction indicated by arrow 54. That is, the leading camera 50 may be configured to record the weld from a position ahead of the weld and to transmit the recorded data to the interface circuitry 40 via cable 56. Similarly, the following camera 52 may be configured to record the weld from a position behind the weld and to transmit the recorded data to the interface circuitry 40 via cable 58. The controller 38 may then be adapted to receive the recorded information from the interface circuitry 40 and to process the inputs from both the leading camera 50 and the following camera 52. For example, the controller 38 may digitally compare the images obtained before and after the weld to identify changes that may be indicative of a defect, such as a burn-through, a suck-back, and so forth. Additionally, the controller 38 may integrate the information gained from the processing of the acquired data from the cameras 50 and 52 with the information gained from the processing of the data from the sensors 42 and 44. The controller 38 may use such information to determine the presence, location, and characteristics of a defect. As before, if a defect is detected, the controller 38 may notify the operator of the defect via the user interface 36 and/or may direct the repair of the defect.

It should be noted that a variety of modifications may be made to the welding system of FIG. 1 in accordance with embodiments of the present invention. For example, although two sensors are depicted in the illustrated embodiment, any suitable number of sensors may be employed in other embodiments. In particular, a particular defect may be indicated by a characteristic change in current but not in voltage, or vice versa. Similarly, where cameras are used, a following camera alone may suffice to identify certain defects, such as bun-through, which may appear as a spot in a following image where no such spot should normally occur. Additionally, it should be noted that as used herein, the term "camera" refers to any suitable device for viewing the weld joint. For example, the camera may be any optical device, any laser scanning device, or any ultrasonic device configured to view the weld joint and/or any defects present in the weld joint.

Furthermore, although the welding system of FIG. 1 depicts a manual welding operation, embodiments of the present invention may be utilized with automatic welding operations that rely on one or more robots to carry out the welding operation. In such cases, the system may be configured to automatically alter welding (e.g., back up to the location of a defect) to perform a repair, where possible. Still further, the welder 12 may include additional system components not shown, such as memory, additional electrical circuitry, and so forth. Indeed, the disclosed systems and methods may be utilized with any laser hybrid welding system. For example, the disclosed embodiments may be utilized in applications that combine GMAW processes, such as metal inert gas (MIG) processes, with laser beam welding and/or applications that combine laser beam welding with plasma arc welding. Finally, certain embodiments may benefit from the detection of defects alone, such as with time or location stamps, all of which may be recorded electronically, such that subsequent operations may be performed to evaluate whether a defect has actually occurred and whether remedial actions are advisable to repair the defect, where possible.

FIG. 2 is a block diagram 60 illustrating exemplary components of the controller 38 of FIG. 1. In the illustrated embodiment, the controller 38 includes a processor 62, interface circuitry 64, control circuitry 66, a clock 68, and memory 70. During operation, the interface circuitry 64 may receive data from one or more devices (e.g., sensors, cameras, etc.) regarding a weld feedback parameter. The interface circuitry 64 communicates such data to the processor 62 where the data is compiled and processed. The processor 62 may store a portion of the data to the memory 70 for later retrieval. The processor 62 may also utilize the clock 68 to time stamp the received data and to determine a location of the detected defect. Furthermore, the processor 62 may be adapted to output a signal to the control circuitry 66 that directs the repair of the defect. The control circuitry 66 may then output a control signal via the interface circuitry 64 that directs the repair of the defect.

Still further, during use, the processor 62 may be configured to communicate the identification of a defect to the operator via the user interface 36 in the welder 12. That is, after receiving and processing the one or more data inputs from the interface circuitry 64, the processor 62 may output a signal that directs the user interface 36 to communicate to the operator the presence of a weld defect and the actions taken to fix the defect. If the data inputs indicate that no weld defect has occurred, the processor 62 may be configured to output a signal to the user interface 36 directing the interface to notify the operator that the welding operation is proceeding without any errors. It should be noted that such communications may take any suitable form. For example, a visual or audible alarm may be generated that the operator can easily detect and identify as such. It is also contemplated that some operators may use specialized equipment such as helmets with operator feedback or communication (e.g., LED's visible in the helmet, head-up displays, headphones, etc.). The notification of the occurrence of a defect, and even a time or location indication, can be provided by such means.

FIG. 3 is a schematic of an exemplary laser-hybrid welding operation 72 that the controller 38 of FIG. 2 may control. The welding operation 72 includes a welding torch 74 that advances an electrode 76 toward the location of the weld, thus generating a welding arc 80. Concurrently, a laser beam 82 is also directed toward the location 78 of the weld. As the weld proceeds in a direction indicated by arrow 84, the laser beam 82 and the welding arc 80 cooperate to form the desired weld in a fusion zone 86. That is, as shown in FIG. 3, the laser beam 82 penetrates the weld material directly in front of the welding arc 80 from the electrode 76. As such, as the laser beam 82 adds light energy to the weld, a tight keyhole is provided for the welding arc 80 to enter. Additionally, the inclusion of the laser beam 82 into the welding operation 72 may stabilize the welding arc 80 as compared to welding operations that function without the laser beam 82. Additionally, the laser beam 82 may facilitate a desirable welding speed, enabling the weld to be completed at a higher speed compared to non-laser beam enhanced welds.

FIG. 4 illustrates an exemplary transverse section of a weld produced by a laser hybrid welding system without a defect in accordance with aspects of the present invention. As shown, a first workpiece 90 and a second workpiece 92 are joined along a weld joint. The illustrated embodiment shows a weld bead 96 as formed during a laser hybrid welding operation. The weld bead may include a root portion and multiple weld passes that complete the weld bead 96 without the presence of any defects.

Figure 5A:
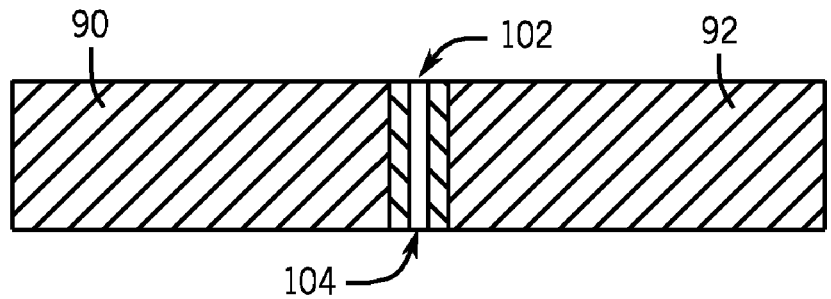
FIG. 5A illustrates an exemplary weld bead that includes a burn-through defect of the type that can be detected and corrected in accordance with aspects of the present invention.
Figure 5B:
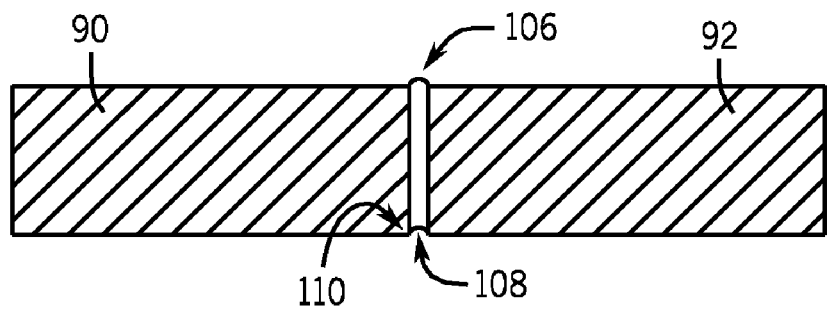
FIG. 5B illustrates an exemplary weld bead that includes a "suck-back" defect that may be susceptible to detection and correction.

FIGS. 5A and 5B illustrate exemplary transverse sections of possible weld defects that may be detected and/or repaired by embodiments of the present invention. Specifically, FIG. 5A illustrates a weld bead 102 that includes a burn through defect 104. That is, when the first workpiece 90 and the second workpiece 92 joined together, excess heat may have caused excess weld metal to penetrate through the location of the weld. That is, excess penetration may have occurred in the illustrated weld bead 102 due to factors such as excess wire feed speed, excessively slow travel speed, and so forth. As discussed in detail below, embodiments of the present invention may allow for detection of burn-through weld beads via a variety of mechanisms, such as evaluating voltage or amperage feedback, utilizing leading and following cameras to image the weld, and so forth.

FIG. 5B illustrates a weld bead 106 that includes a suck-back defect 108. As illustrated, the suck-back weld bead 106 includes weld metal that has contracted back into a root 110 of the weld bead 106 after cooling. Such suck-back defects may occur due to excessive weld puddle temperatures. As before, such a defect may be automatically detected via weld imaging, sensor placement, and so forth during the welding operation. That is, embodiments of the present invention may include detection and repair of such a defect.

It should be noted that the controller may be configured to process one or more acquired measurements, utilize such measurements to identify a defect, and alter one or more parameters of the welding process to ensure that future defects do not occur. For example, in one embodiment, the weld voltage and weld current may be sensed and recorded over time during the welding process. Such data may then be transferred into the frequency domain via a FFT to identify the presence of one or more defects. The presence of a defect may trigger generation of an error signal corresponding to an item in a lookup table or a neural network. The controller may use the item to direct a setting of the welder and/or the laser that will alter the correct parameter to fix the detected defect. Indeed, a variety of such procedures may be utilized by the controller to detect and fix the weld defect.

Figure 6:
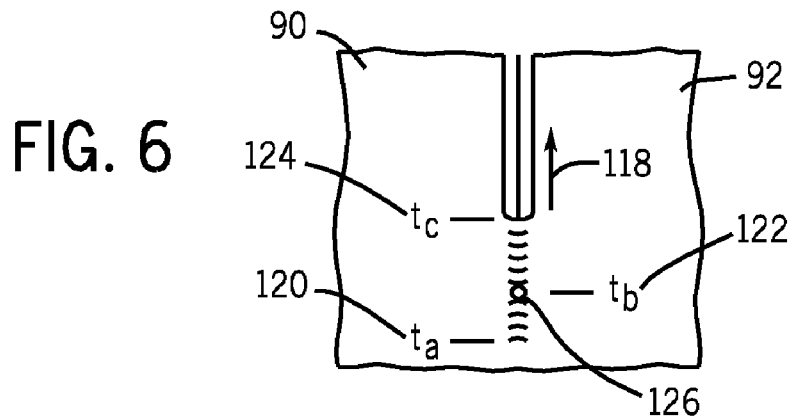
FIG. 6 is a top view of an exemplary welding operation including a weld defect that occurred when joining a first workpiece and a second workpiece through laser hybrid welding.

FIG. 6 is a top view of a welding operation progressing in the direction of arrow 118 to join the first workpiece 90 and the second workpiece 92. As shown, as time progresses from a first time 120 to a second time 122 to a third time 124, the weld is completed and the first workpiece 90 and the second workpiece 92 are joined. However, at the second time 122, a weld defect 126 occurs. The weld defect 126 may be any of a variety of possible weld defects, such as a burn-through, a suck-back, excess weld reinforcement, inadequate weld reinforcement, improper alignment, a crack, incomplete penetration, incomplete fusion, undercut, and so forth. Indeed, the weld defect 126 represents any weld defect that may occur at the second time 122, particularly of a type that can be detected during the progression of a weld or shortly thereafter.

Embodiments of the presently disclosed control system are configured to process data from one or more sensors and/or cameras at the weld location regarding characteristics of the weld. In this way, such embodiments of the control system may be capable of identifying the presence, nature, and location of the weld defect 126. For example, the control system may time stamp the acquired data and integrate the time stamped data with the torch travel speed to determine the location of the defect. Additionally, if the travel speed changes over time along the length of the workpieces, the controller may be configured to integrate the varying travel speed with the time stamped data to determine the position of the weld defect 126.

Figure 7:
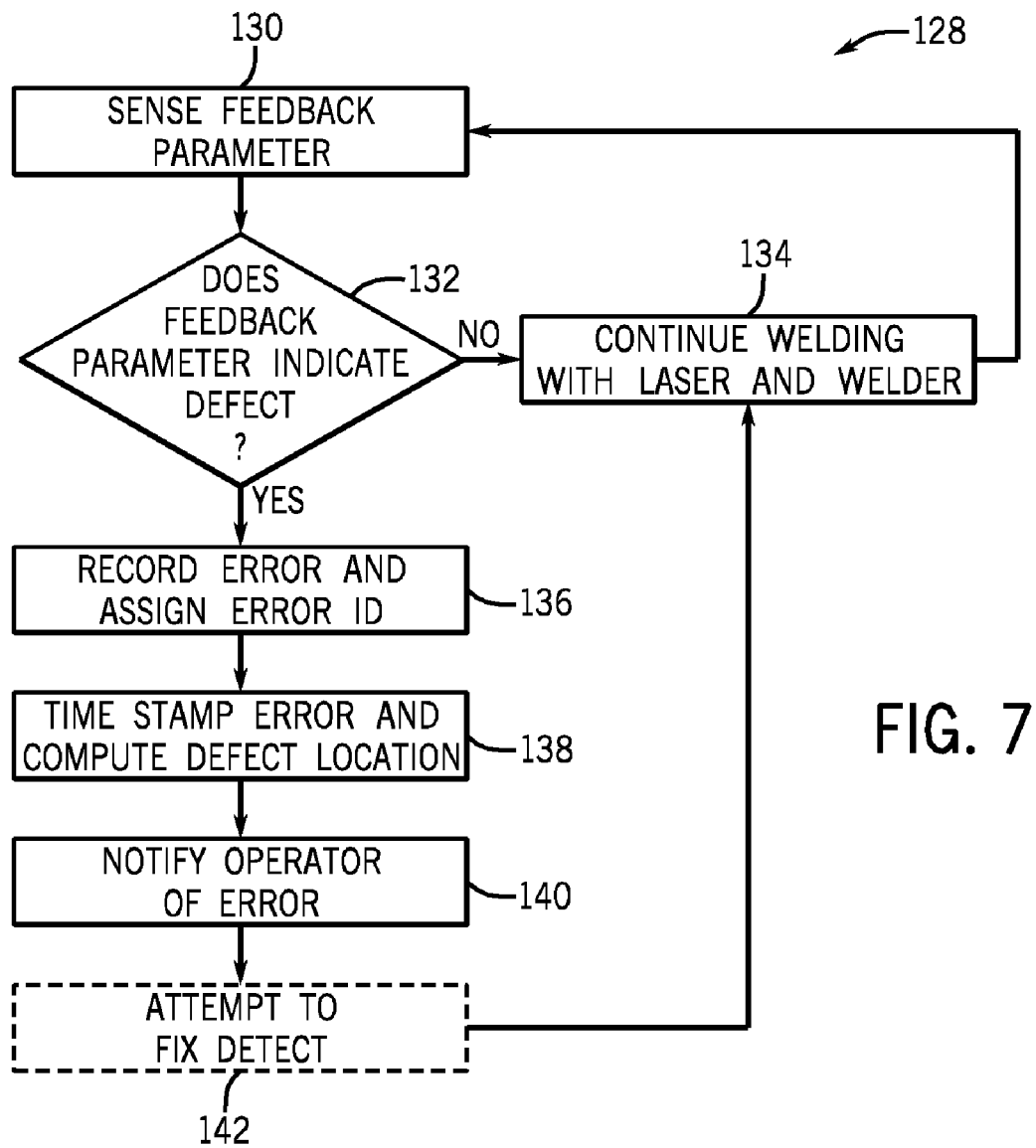
FIG. 7 is a flow chart illustrating an exemplary control scheme that may be utilized by an embodiment of a controller to record and/or repair a weld defect during a laser hybrid welding operation.

FIG. 7 is a flow chart 128 illustrating an exemplary control scheme that may be utilized by an embodiment of the controller. Once the welding system has been activated and a welding operation has begun, the controller senses a feedback parameter (block 130). This feedback parameter may be a weld voltage level, a weld current level, data from a leading camera, data from a following camera, and so forth, or any combination of these. The controller processes the feedback parameter to check whether the feedback parameter indicates the presence of a weld defect (block 132). This will typically involve comparison of the feedback data, or data derived from the feedback data, to known "good weld" characteristics and/or to known defect signatures. For example, certain of the defects may manifest themselves as rapid changes in current and/or voltage, or in a frequency spike in current and/or voltage that can be identified by analysis of the feedback signals in the frequency domain. Similarly, camera feedback may be compared to known appearances of good welds and defects, such as by analysis of brightness, contrast or other characteristics of pixilated data from one or more cameras.

If the feedback parameter does not indicate a weld defect, the controller outputs a control signal that guides the continuation of the welding process (i.e., does not interrupt) with the laser and the welder (block 134). If the feedback parameter does indicate a defect, the controller records the error, assigns the error an error ID (block 136), time stamps the error, and computes the defect location (block 138). It should be noted that the controller may utilize an encoder and/or one or more wireless signals to determine and/or communicate the defect location. The controller may then notify the operator of the error (block 140), for example, through the user interface on the control panel of the welder, or via the welder's equipment (e.g., helmet). If desired, the controller may then output a control signal that directs the welder to attempt to fix the defect (block 142). For example, the controller may direct the positioner or robot to back up and re-weld the area including a gap in the weld if desired. In other embodiments, however, the controller may notify the operator that an error has occurred at the determined location without attempting to repair the weld defect. Still further, the controller may be configured to log all the detected errors throughout a welding operation and provide the operator with a list of detected errors and the locations of the errors. In some embodiments, the welding system may finish the weld and proceed to back up automatically right after the weld is completed. In other embodiments, the welding system may complete the weld and allow a preset or manually set time interval to elapse before backing up to fix the defect.

Figure 8:
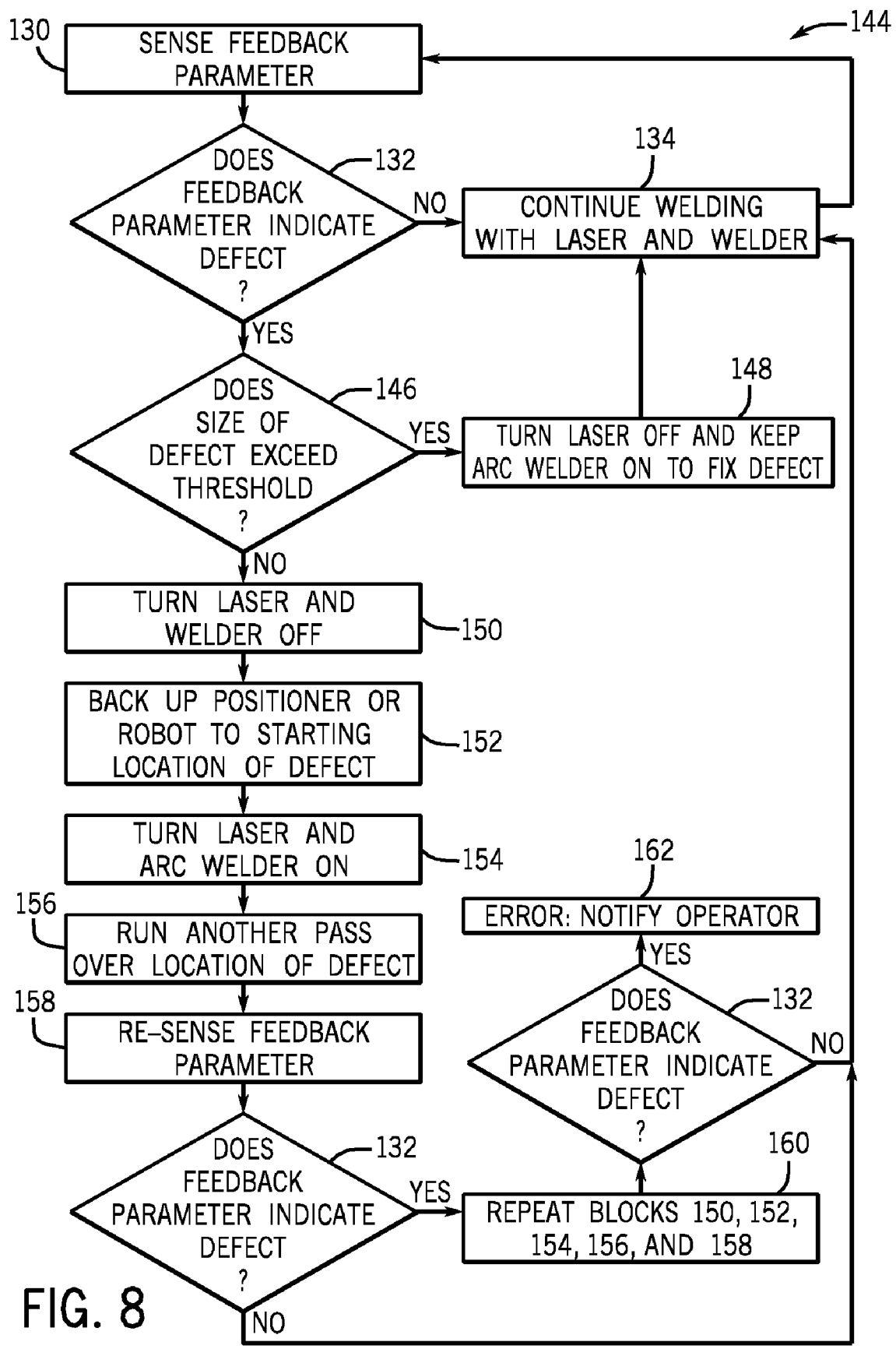
FIG. 8 is a flow chart illustrating an exemplary control scheme that may be utilized by an embodiment of a controller to repair a weld defect during a laser hybrid welding operation.

FIG. 8 is a flow chart 144 illustrating an exemplary control scheme that may be utilized by an embodiment of the controller to fix one or more gap defects in a weld bead. As before, such a control scheme would be employed after activation of the welding system and initiation of a welding operation. The controller first directs the sensing of a feedback parameter (block 130) and then processes the feedback parameter to check whether the feedback parameter indicates the presence of a weld defect (block 132). If the feedback parameter does not indicate a weld defect, the controller outputs a control signal that guides the continuation (or simply does not interrupt) of the welding process with the laser and the welder (block 134). If the feedback parameter does indicate a defect, the controller checks whether the size of the defect exceeds a preset threshold (block 146). That is, the controller checks whether a large burn-through is detected, which indicates the presence of a large gap. If the size of the defect does exceed the threshold, the controller outputs a control signal that directs the laser to turn off and the arc welder to remain on to fill the gap (block 148). In other words, in the presence of a large gap, the controller directs the welding system to employ conventional welding without the laser to repair the gap. After filling the gap, the laser and the welder are activated to continue welding (block 134).

If the size of the defect does not exceed the threshold, the controller directs the laser and the welder to turn off (block 150). The positioner or robot performing the welding is then backed up to the starting location of the defect (block 152) where the laser and the arc welder are turned back on (block 154). The laser hybrid welder is then directed by the controller to run another pass over the location of the defect (block 156). That is, if the detected gap is small, the laser hybrid welding operation may be interrupted to attempt to repair the gap. After repair has been attempted, the feedback parameter is re-sensed (block 158). The controller again checks whether the re-sensed feedback parameter indicates the presence of a defect (block 132). If the feedback indicates the defect has been repaired, the laser-welder is directed to continue welding with the laser and the welder (block 134). Alternatively, if the feedback parameter indicates the presence of a defect, the controller again attempts to fix the defect by repeating blocks 150, 152, 154, 156, and 158 (block 160). After repeating such blocks, the controller again checks if the feedback parameter indicates a defect (block 132). If no defect is detected, the controller directs the welder to weld as normal (block 134). If a defect is still detected, the controller notifies the operator of an error (block 162). The controller may then either terminate the welding operation and wait for operator input or continue welding while noting the location of the defect.

It should be noted that the method illustrated in FIG. 8 is an exemplary method that may be utilized to repair one or more weld defects during the welding process. However, in some embodiments, modifications to the illustrated method may be employed. For example, the controller may be configured to determine, based on feedback received, the length and duration of the weld defect and, based on the determined parameters of the defect, determine whether to stop the welding process to fix the defect when detected or to finish the weld before attempting to fix the defect. For further example, if the length of the defect exceeds a preset length, the controller may direct a stop and restart in the welding process to fix the defect. However, if the length of the defect is small compared to a preset threshold, the controller may allow the weld to be completed before attempting to fix the defect. Still further, in some embodiments, it may be advantageous to complete the weld before stopping and restarting to address one or more weld defects.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A laser hybrid welding system, comprising:
   a welder configured to perform a laser hybrid welding operation in which a workpiece is heated by a laser and filler metal is added by an arc welding process;
   a sensor configured to acquire data regarding a parameter of the laser hybrid welding operation; and
   a controller communicatively coupled to the sensor, wherein the controller is configured to receive the acquired data from the sensor, and to output one or more control signals to control at least one of a laser parameter or a weld parameter of the laser hybrid welding operation based at least in part on the acquired data.

2. The laser hybrid welding system of claim 1, wherein the one or more control signals are configured to alternate between control of the laser parameter and control of the weld parameter.

3. The laser hybrid welding system of claim 1, wherein the sensor comprises a voltage sensor.

4. The laser hybrid welding system of claim 1, wherein the sensor comprises a current sensor.

5. The laser hybrid welding system of claim 1, wherein the sensor comprises an audio sensor.

6. The laser hybrid welding system of claim 1, wherein the sensor comprises a leading camera.

7. The laser hybrid welding system of claim 1, wherein the sensor comprises a following camera.

8. The laser hybrid welding system of claim 1, wherein the sensor comprises an Imagmg sensor.

9. The laser hybrid welding system of claim 8, wherein the imaging sensor comprises a leading camera configured to record a first image of a pre-weld area and a following camera configured to record a second image of a post-weld area.

10. The laser hybrid welding system of claim 1, wherein the sensor comprises a laser scanning device.

11. The laser hybrid welding system of claim 1, wherein the sensor comprises an ultrasonic device.

* * * * *